United States Patent
Gioscia et al.

(10) Patent No.: US 6,407,750 B1
(45) Date of Patent: Jun. 18, 2002

(54) BROADCAST AND RECORDED MUSIC MANAGEMENT SYSTEM PARTICULARLY FOR USE IN AUTOMOBILE

(75) Inventors: Richard Gioscia, Mahwah, NJ (US); Yumi Sonoda, Los Altos, CA (US); Jan-Christoph Zoels, Brooklyn, NY (US)

(73) Assignees: Sony Corporation, Tokyo (JP); Sony Electronics, INC, Park Ridge, NJ (US)

( * ) Notice: Subject to any disclaimer, the term of this patent is extended or adjusted under 35 U.S.C. 154(b) by 0 days.

(21) Appl. No.: 09/227,186

(22) Filed: Jan. 8, 1999

(51) Int. Cl.$^7$ ............................. G06F 3/00; G11B 20/00
(52) U.S. Cl. ................. 345/716; 345/717; 345/727; 345/738; 709/219; 701/36; 369/30; 369/7; 381/86
(58) Field of Search ................... 345/716–718, 345/727, 730, 738, 739, 748, 771, 773; 709/217, 219; 701/36; 369/30, 1, 7, 14, 33, 32; 381/77, 80, 81, 86, 88; 360/5

(56) References Cited

U.S. PATENT DOCUMENTS

| | | | | |
|---|---|---|---|---|
| 4,475,153 A | * | 10/1984 | Kihara et al. | 369/7 X |
| 5,572,442 A | * | 11/1996 | Schwhof et al. | 709/219 |
| 5,675,390 A | * | 10/1997 | Schindler et al. | 345/717 |
| 5,914,941 A | * | 6/1999 | Janky | 709/219 X |
| 6,105,060 A | * | 8/2000 | Rothblatt | 709/219 |
| 6,226,672 B1 | * | 5/2001 | DeMartin et al. | 709/219 |

* cited by examiner

Primary Examiner—Raymond J. Bayerl
(74) Attorney, Agent, or Firm—Ronald P. Kananen; Rader, Fishman & Grauer, PLLC

(57) ABSTRACT

An audio system for managing broadcast and recording music and other audio works includes two principal components, an entertainment programming guide unit and a media manager unit. The programming guide unit, which preferably includes a graphical user interface, can be used to manage a number of recording media in a media deck of the media manager unit. The programming guide may also receive a radio broadcast schedule so that a user can select and record upcoming broadcast works in a memory unit of the media manager unit The programming guide may also download audio files from the internet.

37 Claims, 1 Drawing Sheet

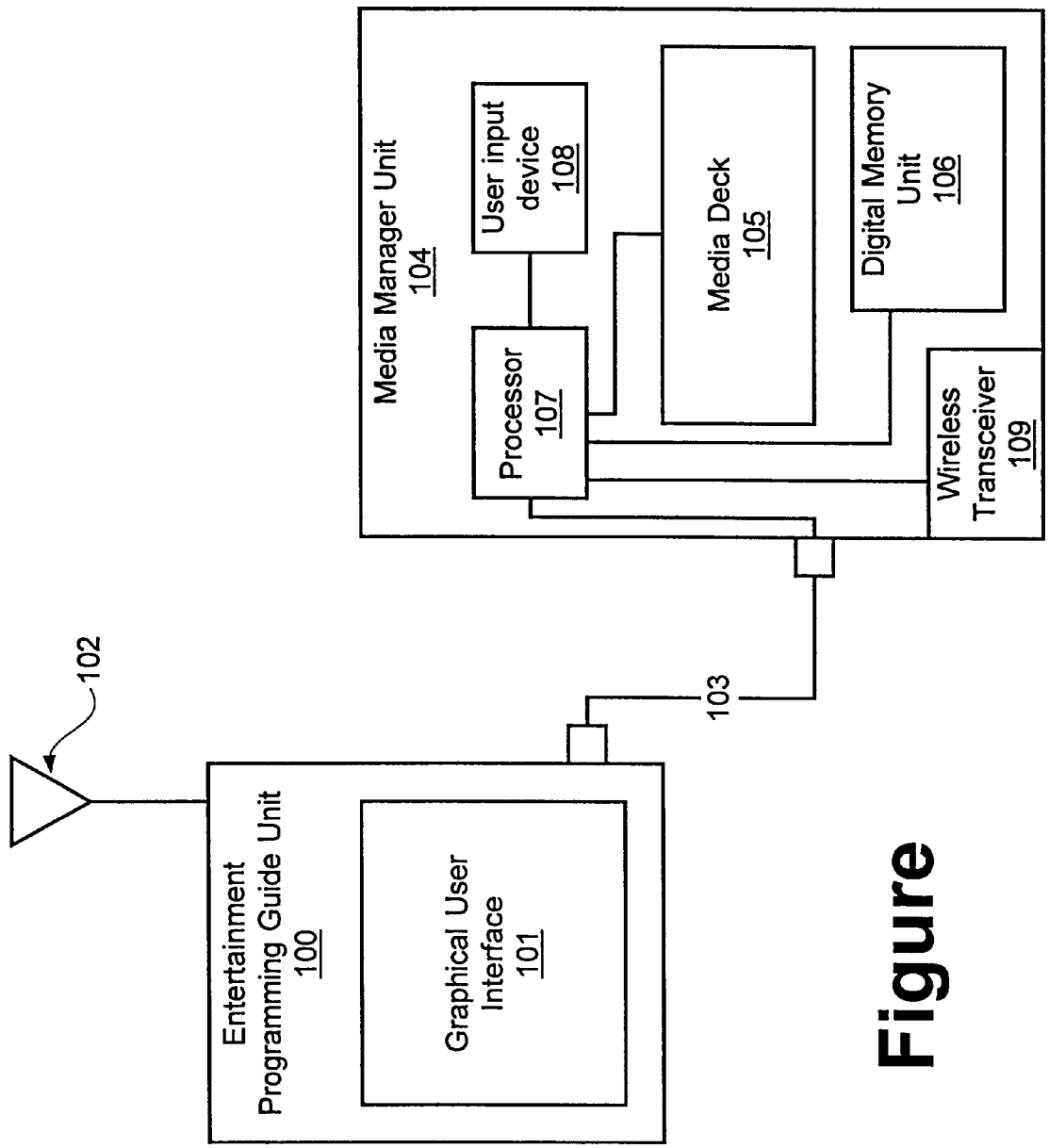

BROADCAST AND RECORDED MUSIC MANAGEMENT SYSTEM PARTICULARLY FOR USE IN AUTOMOBILE

FIELD OF THE INVENTION

The present invention relates to the field of personal audio equipment. More specifically, the present invention relates to a novel management method and system for managing broadcast and recorded music. Particularly, the present invention relates to the field of automobile audio systems.

BACKGROUND OF THE INVENTION

With conventional audio systems for listening to broadcast and recorded music, a user can listen to whatever is being broadcast by the various radio stations in his or her area. Alternatively, the user can play a musical recording from a compact disc. (CD), cassette tape or other recording medium, for example a mini disc (MD) Most conventional personal audio systems, including automobile audio systems, provide both a tuner for receiving radio broadcasts and a recording media deck for playing one of the various types of recording media, e.g. CDs, cassette tapes, or MDs. Frequently, the recording media deck is a tape or disc changer which can hold a number of different tapes or discs and allow the user to select, access and play any one of the tapes or discs housed in the changer.

However, these conventional systems have a number of drawbacks. For example, a listener never knows what is being broadcast and when by the various radio stations he or she can receive. Something that the listener very much desires to hear may be broadcast while the listener is tuned to a different radio station or while the listener is playing a tape or disc instead of listening to the radio.

Additionally, if the listener desires to hear a particular work, but does not have a recording of that work, the listener will simply have to wait until he or she happens to be listening to a radio station which decides to broadcast the desired work. Obviously, it may be a long time before this coincidence occurs. This is particularly likely to happen if the listener is in his or her automobile and has access only to the limited number of recordings in a changer rather than his or her full library of recordings.

Consequently, there is a need in the art for a method and apparatus that allows a listener to better manage reception of broadcast audio and playback of audio recordings. This need is particularly great in the automobile environment,

SUMMARY OF THE INVENTION

It is an object of the present invention to meet the above-described needs and others. Specifically, it is an object of the present invention to provide a system and method for managing broadcast and recording audio so as to provide the greatest possible flexibility in allowing a listener to hear what he or she desires. It is an additional object of the present intention to provide such a method and system that are applicable to the mobile requirements of an automobile.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as an audio management system for managing broadcast and recorded audio works. The system includes a programming guide unit for receiving radio broadcasts and a media manager unit, controlled by the guide unit. The programming guide unit includes a graphical user interface for controlling the system. The media manager unit includes a media deck for containing and reading at least one recording medium, such as a CD. Preferably, the graphical user interface includes a touch-sensitive, display.

Under the principles of the present invention, the programming guide unit receives and displays a broadcast schedule of audio works to be broadcast by local radio stations. The schedule may be received via wireless radio broadcast or over a wireless link between the guide unit and the internet.

Preferably, the media manager unit also includes a memory unit in which data can be stored by the system. When a broadcast item is selected from the schedule with the guide unit, the guide unit records the selected item in the memory unit as it is broadcast The media manager unit also preferably includes a transceiver such that data may be input to the media manager through the transceiver and stored in the memory unit Preferably, the transceiver is a wireless transceiver. The input data may be an audio file or contextual information associated with a particular recording medium in the media deck.

The programming guide unit may also wirelessly access the internet to download audio files. These downloaded audio files may be played as an audio data stream or stored in the memory unit of the media manager unit.

The system of the present invention may be used as a portable or home audio system, but is preferably used as an automobile audio system. In such a case, the media manager unit is connected to the programming guide unit with a friction fit connector so as to be readily disconnected. In this way, the media manager can be removed from the automobile so that data can be input through the transceiver. The media manager unit may include a second user interface for controlling the media manager unit when disconnected from the programming guide unit.

The present invention also encompasses the method of making and implementing the system described above. Particularly, the present invention encompasses a method of managing broadcast and recorded audio works with a system that includes a programming guide unit for receiving radio broadcasts and a media manager unit, controlled by the programming guide unit, for containing and reading at least one recording medium. The method includes displaying graphic or pictorial information about the at least one recording medium in the media deck of the media manager unit with a graphical user interface of the programming guide unit. The method continues by controlling replay of the at least one recording medium with a touch-sensitive display of the graphical user interface.

BRIEF DESCRIPTION OF THE DRAWING

The accompanying drawing illustrates the present invention and is a part of the specification. Together with the following description, the drawing demonstrates and explains the principles of the present invention.

The FIGURE is a block diagram of an audio management system according to the principles of the present invention.

DETAILED DESCRIPTION OF THE PREFERRED EMBODIMENTS

Using the drawing, the preferred embodiment of the present invention will now be explained. As shown in the FIGURE, the present invention may be embodied as an audio management system including two principal components: an entertainment programming guide unit (100) and a media manager unit (104).

These two components may be provided in a single housing or in separate housings. If the audio management system is to be used as an automobile audio system, it may be preferable to provide the two components (100 and 104) in separate housings so that they can be physically displaced from each other. For example, the programming guide unit (100) might be incorporated into the automobile's control console or dashboard, or placed where the driver/listener can access it. While, the media manager unit (104) might be placed in a less visible location where more space is available such as in the car's trunk or under a seat.

Alternatively, if the audio management system is to be a portable system in the nature of boom box or the like, it may be preferable to combine the two principal components (100 and 104) into a single unitary housing. The system of the present invention could also be used as a stationary or "in home" audio system comprising one single housing or two separate housings.

In any event, the two components, the programming guide unit (100) and the media manager unit (104), are electrically connected via connection (103). If the two components (100 and 104) are provided in separate housings, the connection (103) is preferably plugged into the two respective components with a friction fit plug or jack so that the connector (103) can be easily connected and disconnected from the components (100 and 104), particularly the media manager unit (104).

The entertainment programming guide unit comprises a tuner, a user interface (101) and an antenna (102) As will be explained, the antenna (102) can be used to receive both digital and analog signals.

The tuner of the programming guide unit (100) is connected to the antenna and to a speaker system (not shown) so that the user can listen to any radio broadcast available in the area. The speaker system may be any system for transducing an audio signal into audible sound, for example headphones, car speakers, home speakers or speakers which are integrated into the housing of the programming guide unit (100). The tuner is controlled through the user interface (101).

The user interface (101) may be any device by which the listener can control the audio system of the present invention. Such an interface could equivalently contain any number of control devices such as buttons, dials, knobs, switches, a liquid crystal display, etc.

Preferably, the user interface (101) is a graphical interface with a graphical display device. The graphical display device may be used in conjunction with other control devices such as those mentioned above. Additionally or alternatively, the graphical user interface (101) may have a touch sensitive graphical display so that the user can control the audio system by touching icons or other graphical indicators on the display of the interface (101).

The media manager unit (104) includes a processor (107) and a media deck (105). The processor (107) is connected to and generally controlled by the user interface (101) of the programming guide unit (100). The media deck (105), connected through the processor (107), contains one or more audio recording media, e.g. CDs, MDs or cassette tapes.

Preferably, each recording medium in the deck (105) also has recorded thereon a graphical symbol which can be read by the deck (105) and displayed on the graphical user interface (101) to represent that particular recording medium. When the graphical symbol for a particular recording medium in the deck (105) is selected through the user interface (101), that recording medium is accessed by the deck (105). The listener tray then, using the interface (101), play any or all of the tracks on that recording medium.

Additionally, each recording medium in the deck (105) may also have recorded thereon contextual information such as, lyrics, cover art, information about the artist or artists, etc. This information may be provided to the graphical user interface (101) for use by the listener when that particular recording medium is selected.

If this desired contextual information is not recorded on the recording media in the deck (105), the user can provide such information to the media manager unit (104) for storage in a digital memory unit (106). A transceiver (109) may be provided as part of the media manager unit (104). This transceiver (109) may be a wire-line connection with which the user may connect the media manager unit (104) to a computer or other data terminal for entering data. However, the transceiver (109) is preferably a wireless transceiver, for example, an infrared, radio frequency or ultrasonic transceiver.

Through the transceiver (109), the user may input contextual information about a recording medium in the deck (105) for storage in the memory unit (106). The processor (107) can then be used to associate the data stored in the memory unit (106) with particular recording media in the deck (105).

Additionally, if the listener has a digital music library stored, for example on a computer, rather than on traditional recording media, the transceiver (109) may be used to copy that music or other audio works to the digital memory unit (106). In this way, digital audio recordings that were previously available only on the listener's computer, for example, can be heard with the automobile or portable audio system of the FIGURE. An auxiliary user input device (108) maybe provided with the media manager unit (104) so that the user can control uploading and downloading of data to the media manager unit (104) through the transceiver (109) when graphical user interface (101) of the programming guide unit (100) is not connected to the media manager unit (104).

Under the principles of the present invention, the programming guide unit (100), using the antenna (102), has access to other sources of data than traditional radio broadcasts only. For example, it is anticipated that in the future radio broadcasting will move from the traditional analog format to a digital format. Consequently, radio broadcasters are and will be able to embed more data in their broadcasts. Additionally, the antenna (102) may be used to connect to the internet through an existing or newly-provided wireless infrastructure.

If the programming guide unit (100) is receiving digital radio broadcasts, under the principles of the present invention, those broadcasts may include a programming schedule of what is to be broadcast for a specified period of time by the radio station. Using the interface (101), the user can scan through the programming schedule and sort the schedule by radio station, genre, or any other criteria.

The user can then identify from the broadcasting schedule selections that he or she wishes to receive. The tuner of the programming guide unit (100) can then appropriately tune the desired broadcast. Alternatively, the user may identify a selection which will be broadcast in the future that he or she wishes to hear. The user may then, with the interface (101), select that future broadcast for recording. The system of the present invention will then record the designated radio broadcast in the memory unit 106 so that it can be retrieved and listened to by the user at any time.

The recording may be performed regardless of whether the user is using the system. The user interface (101) will also include a file management application so that the user may identify, copy, delete, etc. audio files stored in the memory unit (106).

Additionally or alternatively, if the user is using the system, a reminder may be provided to the user by the interface (101) that the selected broadcast is about to be made. Thus, the user may be able to catch the desired broadcast live, if desired, as well as or rather than recording it.

If the radio stations in the area do not have the capability or do not desire to accept the expense of broadcasting a programming schedule as in the preceding example, the programming schedule can be provided by the radio station over the internet. As noted above, the antenna (102) can be used to access the internet through a wireless infrastructure. Thus, the programming guide with which the user can identify select and record upcoming broadcasts can be provided over the internet to the programming guide unit (100) rather than by broadcast.

Access to the internet also provides the programming guide unit (100) with another feature. If the user wishes to hear a particular work that is not being broadcast and is not recorded in the memory unit (106) or on a recording medium in the media deck (105), the user may access a server on the internet from which an audio file of the work can be downloaded. This download may be played as an audio stream by the programming guide unit (100) and/or may be stored in the memory unit (106) for later reference.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An audio management system comprising:
   a programming guide unit, said programming guide unit receiving multimedia content, the enclosure of said programming guide unit being adapted for incorporation into the structure of a mobile vehicle; and
   a media manager unit including a user input device, said programming guide unit providing an input for directing said media manager unit to record said multimedia content on a recording medium when said media manager unit is interfaced to said programming guide unit, and said user input device providing a command for directing said media manager unit to record said multimedia content on a recording medium when said media manager unit is not interfaced to said programming guide unit.

2. The system of claim 1, wherein said multimedia content is an audio work.

3. The system of claim 1, wherein said programming guide unit and said media manager unit are enclosed within a common housing, said common housing being said enclosure.

4. The system of claim 3, wherein said programming guide unit housing is separate and apart from said media manager unit housing.

5. The system of claim 1, wherein said programming guide unit is enclosed within a programming guide unit housing, said media manager unit is enclosed within a media manager unit housing, said programming guide unit housing being said enclosure.

6. The system of claim 1, wherein said programming guide unit wirelessly accesses the internet to download audio files.

7. The system of claim 1, wherein said programming guide unit is structurally adapted for incorporation into a control console of said mobile vehicle.

8. The system of claim 1, wherein said programming guide unit is structurally adapted for incorporation into a dashboard of said mobile vehicle.

9. The system of claim 1, wherein said mobile vehicle is capable of transporting a person.

10. The system of claim 1, wherein said programming guide unit processes a digital signal.

11. The system of claim 1, wherein said programming guide unit processes an analog signal.

12. The system of claim 1, wherein said programming guide unit includes a user interface, said user interface controlling said audio management system.

13. The system of claim 12, wherein said user interface comprises a touch-sensitive display.

14. The system of claim 1, wherein said programming guide unit displays a broadcast schedule of said multimedia content to be broadcast.

15. The system of claim 14, wherein said broadcast schedule is received via wireless radio broadcast.

16. The system of claim 14, wherein said guide unit wirelessly accesses the internet to receive said broadcast schedule.

17. The system of claim 1, wherein said media manager unit includes a media deck, memory, a processor, a user input device, and a transceiver.

18. The system of claim 17, wherein said multimedia content is stored in said memory as an audio file.

19. The system of claim 17, wherein said media deck reads said multimedia content from said memory.

20. The system of claim 17, wherein said programming guide unit provides an input for directing said media manager unit to store said multimedia content within said memory.

21. The system of claim 17, wherein said user input device provides an input for directing said media manager unit to store said multimedia content within said memory.

22. The system of claim 17, wherein said media deck contains a recording medium.

23. The system of claim 17, wherein said media deck reads a recording medium.

24. The system of claim 17, wherein said processor is controlled by said programming guide unit to record said multimedia content on a recording medium.

25. The system of claim 17, wherein said transceiver receives contextual information, said contextual information being provided to said programming guide unit.

26. The system of claim 25, wherein said contextual information identifies a particular recording medium, said particular recording medium being incorporated within said media deck.

27. The system of claim 17, wherein said transceiver receives said multimedia content.

28. The system of claim 27, wherein said transceiver receives said multimedia content when said media manager unit is not interfaced to said programming guide unit.

29. An audio management system comprising:

a first means, said first means receiving multimedia content and being structurally adapted for incorporation into a mobile vehicle; and a second means including an input device, said second means being controlled by said first means to record said multimedia content on a recording medium when said second means is interfaced to said first means, and being controlled by said input device when said second means is not interfaced to said first means.

30. The system of claim 29, wherein said first means wirelessly receives and displays a broadcast schedule of audio works to be broadcast.

31. The system of claim 30, wherein:

said second means further comprises a memory means; and when a broadcast item is selected from said schedule with said first means, said first means records said selected item, as it is broadcast, in said memory means.

32. The system of claim 29, wherein said second means further comprises a memory means and a transceiver means such that data may be input to said second means through said transceiver means and stored in said memory means.

33. A method of managing multimedia content comprising:

incorporating a programming guide unit into a mobile vehicle;

receiving multimedia content, said programming guide unit performing said step of receiving said multimedia content; and recording said multimedia content on a recording medium, a media manager unit performing said step of recording said multimedia content, said media manager unit including a user input device, said programming guide unit providing an input for directing said media manager unit to perform said step of recording said multimedia content when said media manager unit is interfaced to said programming guide unit, and said user input device providing a command for directing said media manager unit to perform said step of recording said multimedia content when said media manager unit is not interfaced to said programming guide unit.

34. The method of claim 33, wherein said multimedia content is an audio work.

35. The method of claim 33, wherein said programming guide unit is structurally adapted for incorporation into a control console of said mobile vehicle.

36. The method of claim 33, wherein said programming guide unit is structurally adapted for incorporation into a dashboard of said mobile vehicle.

37. The method of claim 33, wherein said mobile vehicle is capable of transporting a person.

* * * * *